United States Patent

[11] 3,533,484

| [72] | Inventor | Garfield A. Wood, Jr.,<br>4565 Sabal Palm Road, Bay Point, Miami, Florida 33137 |
|---|---|---|
| [21] | Appl. No. | 729,590 |
| [22] | Filed | May 16, 1968 |
| [45] | Patented | Oct. 13, 1970<br>A continuation-in-part of application Ser. No. 641,691, May 26, 1967, now abandoned. This application May 16, 1968, Ser. No. 729,590 |

[54] ELECTRIC POWER UNIT
14 Claims, 22 Drawing Figs.

[52] U.S. Cl. .................................... 180/65,
15/250.17, 74/665, 180/31, 180/34, 310/67, 310/83, 310/112
[51] Int. Cl. ...................................... B60k 7/00, B60k 1/02
[50] Field of Search ........................... 180/65, 34, 31, 33.3, 33.4, 60, 10, 62; 74/665(A), 665(B), 665(N); 15/250.17; 310/154, 112, 83, 67

[56] References Cited
UNITED STATES PATENTS

| 552,271 | 12/1895 | Bolton | 180/34 |
|---|---|---|---|
| 722,916 | 3/1903 | Scott | 310/112 |
| 1,172,456 | 2/1916 | Hoadley | 310/67 |
| 2,179,418 | 11/1939 | McDonald | 180/34X |
| 2,357,152 | 8/1944 | Whitted | 15/250.17 |
| 2,463,349 | 3/1949 | Baner | 310/112 |
| 2,581,551 | 1/1952 | Myrmirides | 180/65X |
| 2,771,562 | 11/1956 | McCarthy et al. | 310/83X |
| 3,090,877 | 5/1963 | Baumhart | 310/154 |
| 3,234,417 | 2/1966 | Somers et al. | 310/154 |
| 3,387,502 | 6/1968 | LeTourneau | 180/65X |

FOREIGN PATENTS

| 137,872 | 7/1950 | Australia | 180/33.3 |
|---|---|---|---|
| 728,469 | 11/1942 | Germany | 310/67 |
| 737,859 | 7/1943 | Germany | 310/112 |

*Primary Examiner*—Benjamin Hersh
*Assistant Examiner*—Milton L. Smith
*Attorney*—Lane, Aitken, Dunner and Ziems

ABSTRACT: A DC electric power unit comprising a cup shaped housing having a plurality of small permanent magnet motors mounted thereon in position to rotate an internal ring gear rotatably mounted within the cup-shaped housing. The power unit can be used for a wide variety of applications, but is specifically disclosed for propelling wheeled vehicles such as a bicycle, a tricycle, a gokart and a small automobile. In some wheeled vehicles the power unit is mounted in position to directly drive a wheel of the vehicle, and in others, it is mounted in position to drive a wheel of the vehicle through a chain and sprocket drive. In one bicycle embodiment it is mounted in a manner to enable the bicycle to be pedalled by the rider to assist the power unit if this becomes necessary.

Patented Oct. 13, 1970

INVENTOR
Garfield A. Wood, Jr.

BY
Lane, Aitken, Dunner & Ziems
ATTORNEYS

Patented Oct. 13, 1970

INVENTOR
Garfield A. Wood, Jr.

BY Lane, Aitken, Dunner + Ziems
ATTORNEYS

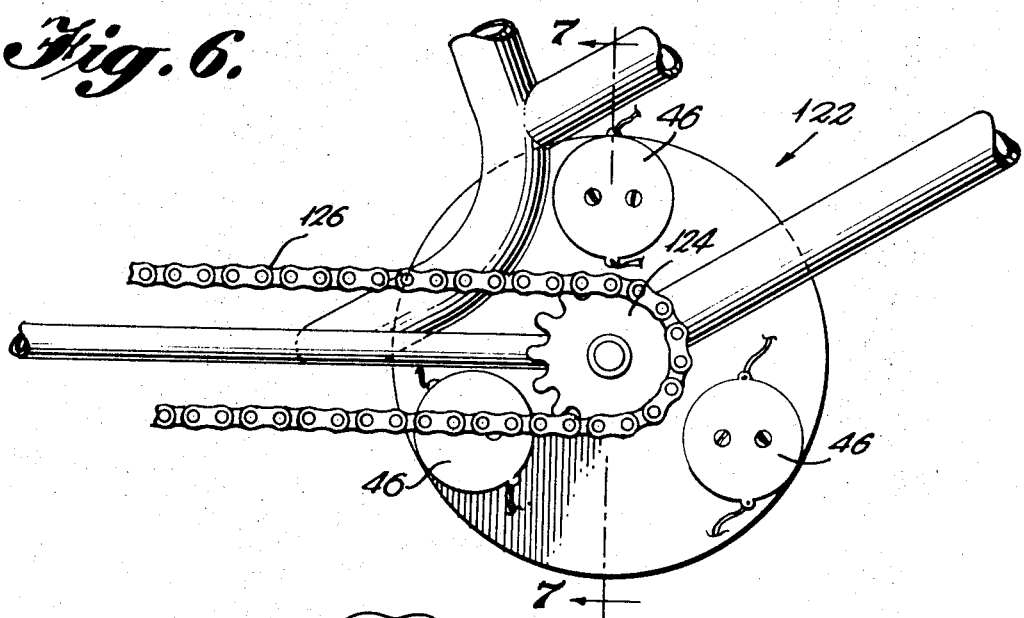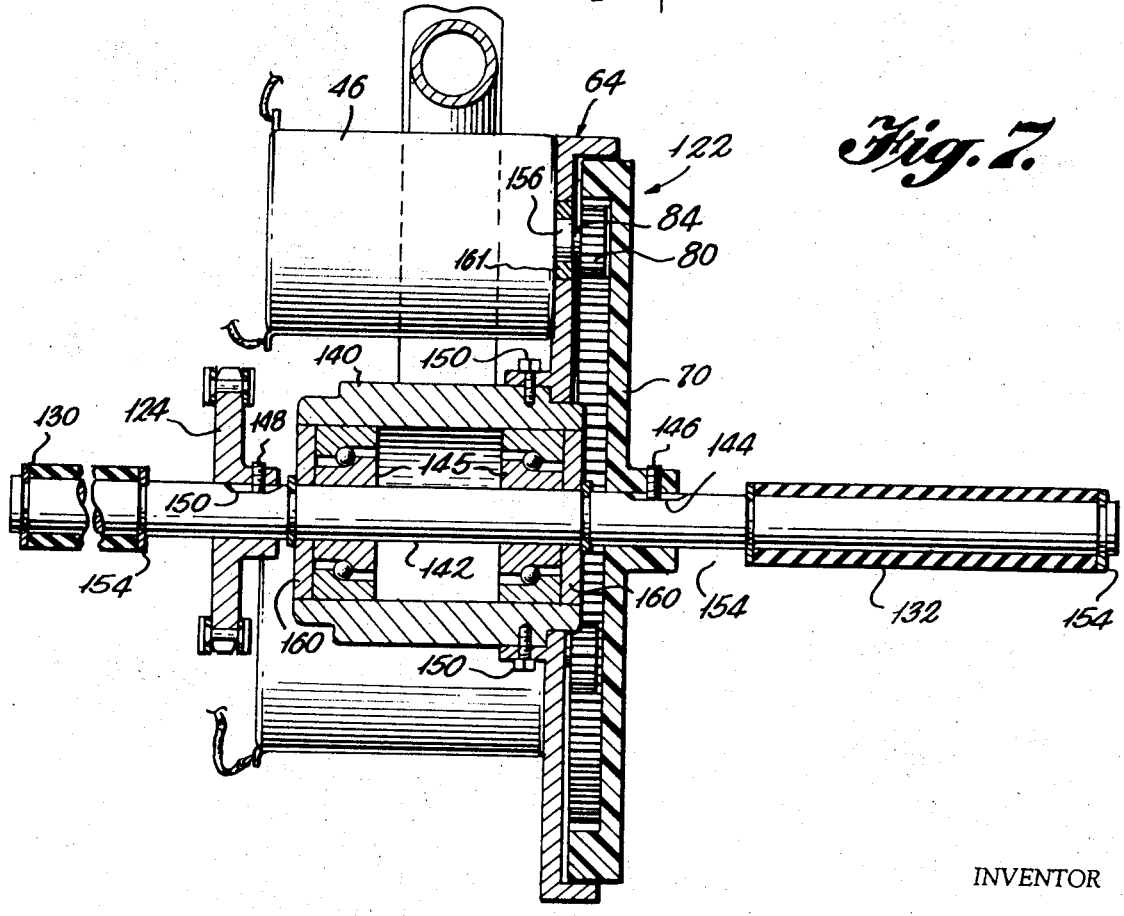

Patented Oct. 13, 1970

INVENTOR
Garfield A. Wood, Jr.

BY Lane, Aitken, Dunner & Ziems
ATTORNEYS

Patented Oct. 13, 1970
3,533,484
Sheet 5 of 10
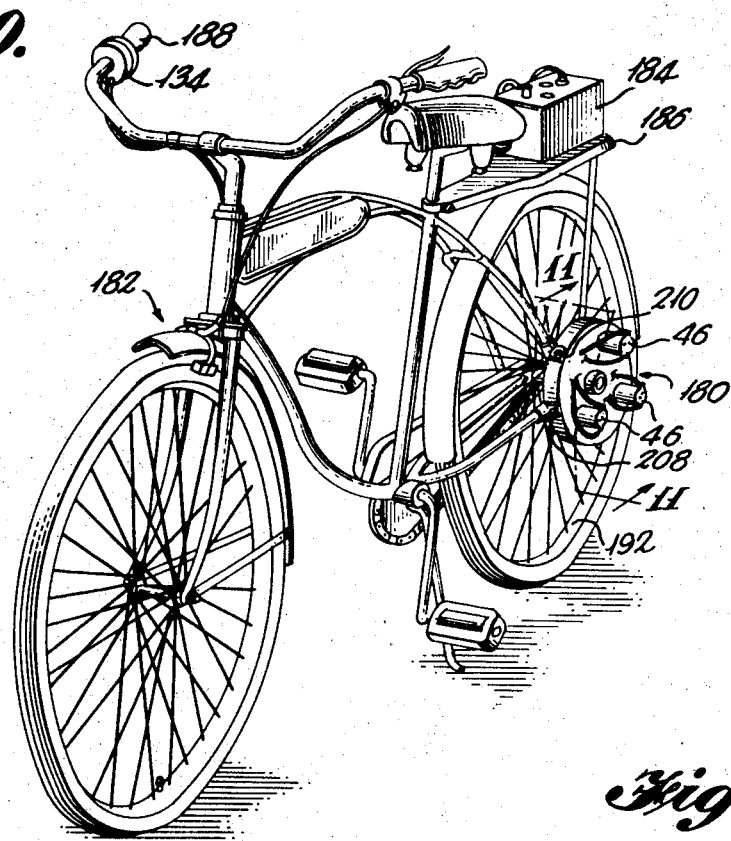
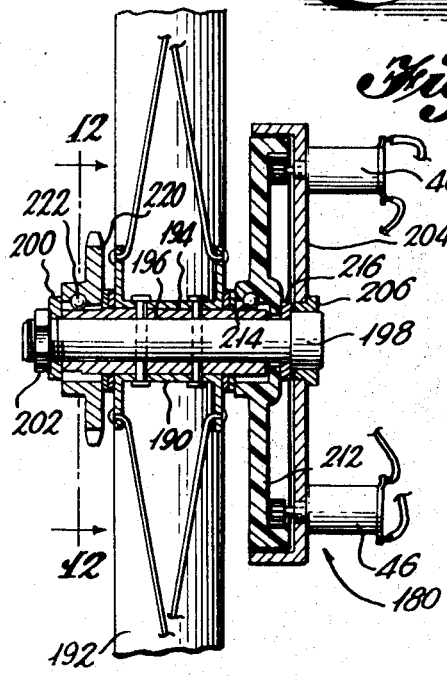
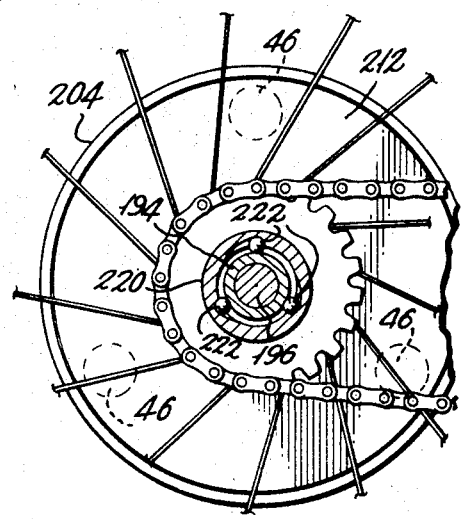
INVENTOR
Garfield A. Wood, Jr.
BY Lane, Aitken, Dunner & Ziems
ATTORNEYS

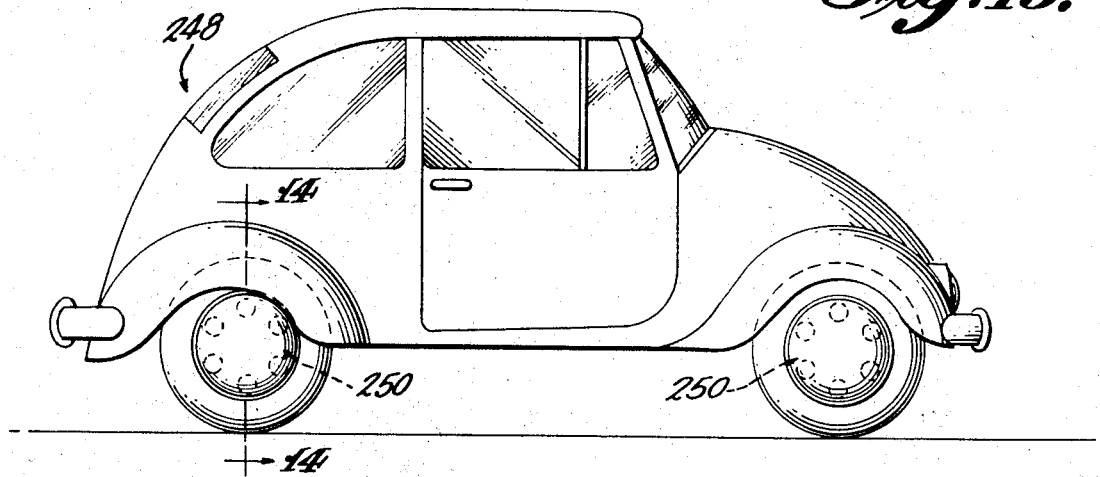
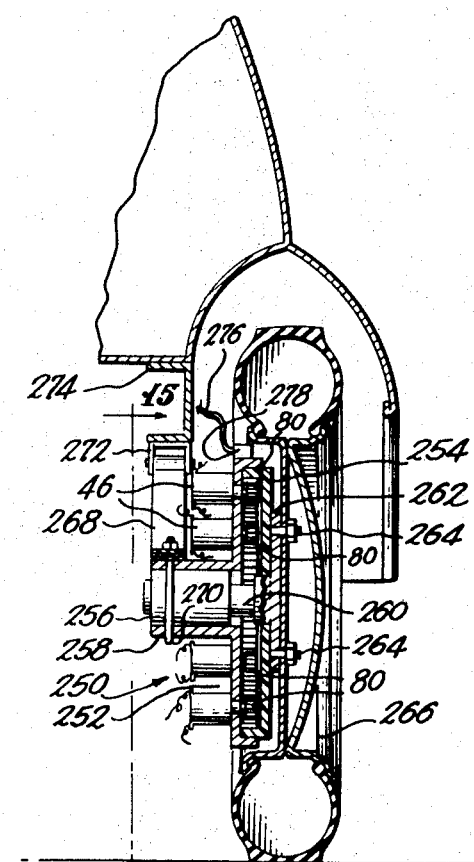
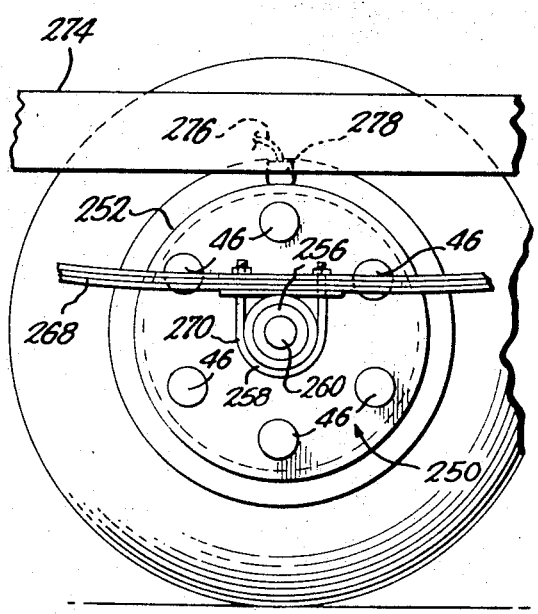

Patented Oct. 13, 1970

INVENTOR
GARFIELD A. WOOD, JR.

BY
Lane, Aitken, Dunner & Ziems
ATTORNEYS

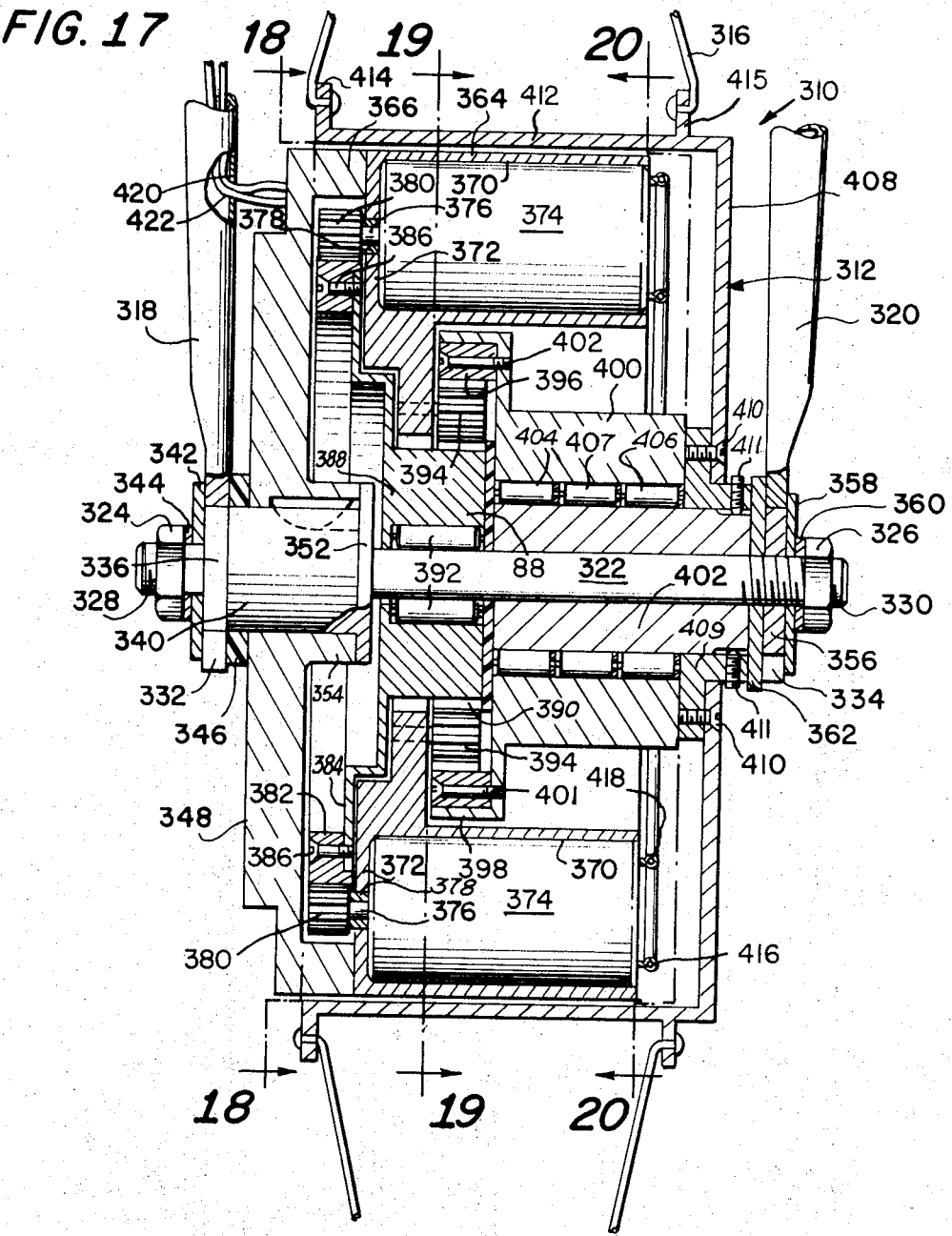

Patented Oct. 13, 1970

INVENTOR
GARFIELD A. WOOD, JR.

BY
Lane, Aitken, Dunner & Ziems
ATTORNEYS

Patented Oct. 13, 1970

INVENTOR
GARFIELD A. WOOD, JR.

BY
Lane, Aitken, Dunner & Ziems
ATTORNEYS

ELECTRIC POWER UNIT

BACKGROUND OF THE INVENTION

The present invention relates to electric power units and more particularly to an electric power unit for propelling a wheeled vehicle.

Prior art electrically driven vehicles have employed a single field wound motor for driving the vehicle. In some cases the motor is mounted within a wheel of the vehicle to drive the wheel directly. In either case the field wound electric motor is heavy, relatively expensive and not particularly efficient.

SUMMARY

The present invention provides a compact electric power unit comprising a plurality of small electric motors mounted in position to drive an output member. The output member can be utilized in a number of ways depending on the particular application involved. In the case of a wheeled vehicle the output member can be drivingly connected to one or more of the wheels of the vehicle. If one of the small electric motors fails, it can easily be replaced and the power unit will continue to operate until it is replaced. The power provided by the unit can be varied by simply varying the number of motors employed with the power unit.

More specifically, the motors are small permanent magnet motors and the output member of the power unit is an internal ring gear. Small pinion gears are mounted directly on the output shafts of the permanent magnet motors and mesh directly with the internal gear teeth of the ring gear. This provides a compact motor and gear reduction unit wherein the ring gear rotates at a reduced speed as compared with the r.p.m. of the pinion gears. By arranging the motors symmetrically within the internal ring gear, the forces on the ring gear can be balanced. Distributing the driving force over a plurality of pinion gears makes possible the use of a molded plastic internal ring gear which results in additional cost savings.

Employing a plurality of small permanent magnet electric motors in place of a single larger field wound motor results in additional cost savings and weight reduction. The permanent magnet motors can be the mass produced Japanese motor used on many toys for children. Since the cost of these motors in not much more than the cost of a good light bulb, it is very practical for the user of the power unit to maintain a small supply of extra motors for replacement purposes. Tests conducted to date also indicate that the power unit with these small permanent magnet motors energized by a DC battery is more efficient than a single larger motor and drive which provides comparable power and speed.

BRIEF DESCRIPTION OF THE DRAWINGS

FIG. 6 is an enlarged view of the power unit of FIG. 5 looking in the direction of the arrow A in FIG. 5;

FIG. 7 is a sectional view taken along the line 7–7 of FIG. 6;

FIG. 10 is a perspective view of a bicycle having an electric power unit of the present invention mounted thereon for driving the rear wheel;

FIG. 11 is an enlarged sectional view taken along the line 11–11 of FIG. 10;

FIG. 12 is a sectional view taken along the line 12–12 of FIG. 11;

FIG. 13 is a side view of a small automotive vehicle driven by power units of the present invention connected directly to the wheels thereof;

FIG. 14 is an enlarged sectional view taken along the line 14–14 of FIG 13;

FIG. 15 is a view taken along the line 15–15 of FIG. 14;

FIG. 17 is an enlarged sectional view taken along the line 17–17 of FIG. 16;

DESCRIPTION OF THE PREFERRED EMBODIMENTS

Figure 1:
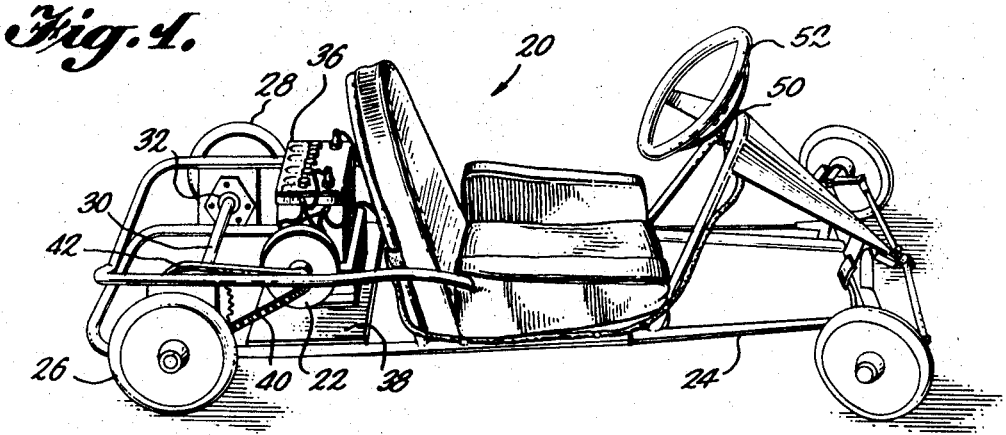
FIG. 1 is a perspective view of a go-kart powered by an electric power unit of the present invention.
Figure 2:
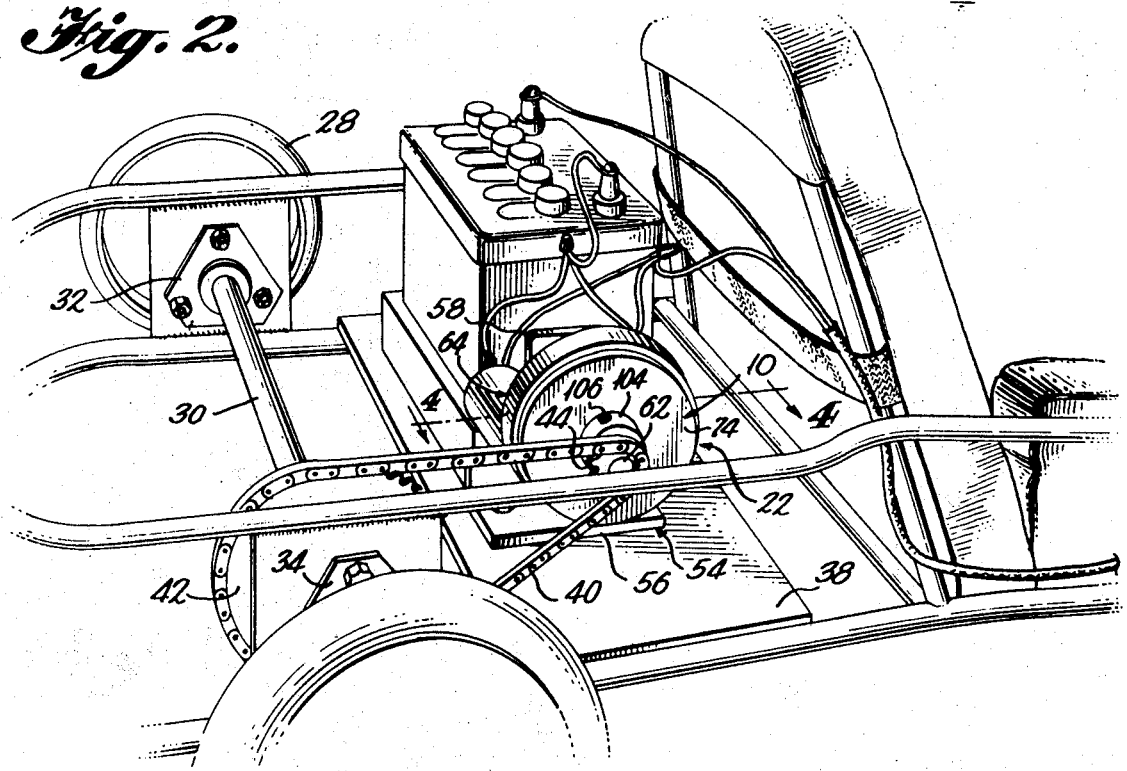
FIG. 2 is an enlarged fragmentary perspective view of the gokart of FIG. 1 illustrating the power unit more clearly.

Referring to FIGS. 1 and 2 a conventional go-kart 20 is illustrated which is powered by an electric power unit 22 embodying features of the invention. The go-kart 20 has a tubular frame 24 with a pair of rear wheels 26 and 28 drivingly connected to an axle 30. The axle 30 is rotatably journaled in bearings 32 and 34 mounted on the tubular frame 24. The power unit 22 and a conventional 12-volt DC automotive battery 36 of the size used in small foreign cars are supported by a base plate 38 connected across the tubular frame 24 of the go-kart forwardly of the rear axle 30.

The power unit 22 is drivingly connected to the rear axle 30 by a chain 40 which interconnects a large sprocket 42 keyed to the rear axle 30 and a small sprocket 44 keyed to the output shaft of the power unit, as will be described. The power unit has two small electric motors 46 as most clearly illustrated in FIG. 3. An electric switch 50 is mounted on the go-kart adjacent to the steering wheel 52 and suitable wiring is provided for electrically connecting the two motors in parallel with one another and the parallel connected motors in series with the battery 36 and switch 50.

With this arrangement, the motors are energized when the switch 50 is turned on and the go-kart operates at one speed. The particular go-kart illustrated in FIG. 1, is designed to run about 4 to 6 miles an hour which is a desirable speed for a small child. As will be explained in greater detail hereinafter, the speed and power of the go-kart can easily be increased as the child grows older by simply adding additional motors and changing one or the other of the sprockets 42 and 44. Thus the go-kart can in effect grow with the child.

Figure 3:
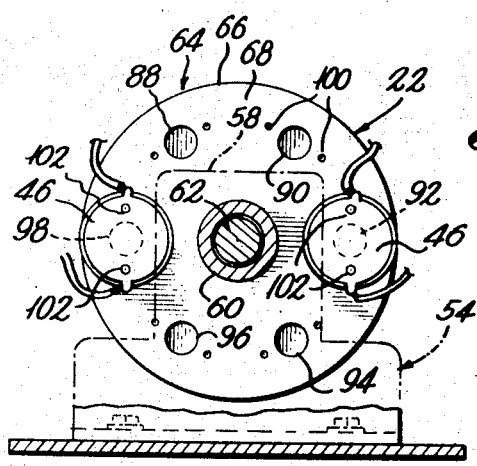
FIG. 3 is a sectional view taken between the power unit and the vertical supporting plate for the power unit.
Figure 4:
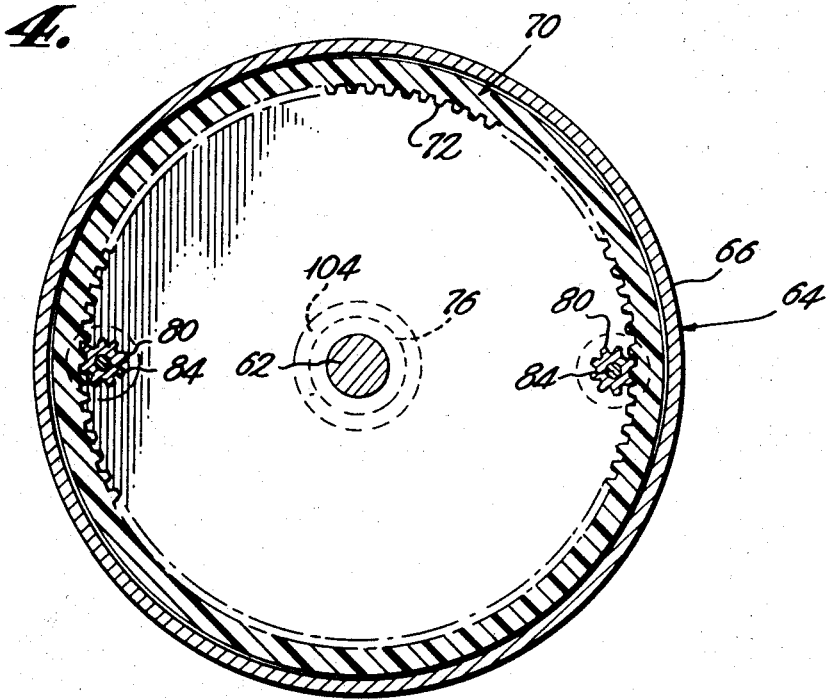
FIG. 4 is an enlarged sectional view taken along the line 4–4 of FIG. 2.

Referring to FIGS. 2 thru 4, the power unit 22 is mounted on the base plate 38 by an angle shaped supporting member 54 having a horizontal portion 56 fastened directly to the base plate 38 and a vertical portion 58. A sleeve 60 is suitably fixed to the vertical portion 58 in position to rotatably journal a shaft 62 which projects through the power unit 22.

The power unit comprises a cup-shaped housing 64 having a cylindrical wall 66 and a circular end wall 68. A projecting hub on the end wall 68 (similar to the hub shown in FIG. 7) is connected to the fixed sleeve 60 to mount the cup-shaped housing against rotation. An internal ring gear 70 having internal gear teeth 72 and a circular end wall 74 is positioned within the cup-shaped housing 64 and fixed to the shaft 62 for rotation therewith. A hub 76 projects outwardly from the end wall 74 to provide sufficient room for a set screw for keying the internal ring gear to the shaft 62. Pinion gears 80 are fixed to the output shafts 84 of the motors 46 in position to mesh with the internal gear teeth 72 of the ring gear at diametrically opposed positions.

As best seen in FIG. 3, the end wall 68 of the cup-shaped housing 64 is provided with six symmetrically oriented holes 88—98, the motors 46 being mounted over the diametrically opposed holes 92 and 98. A pair of threaded bolt holes 100 are provided on opposite sides of each of the holes 88—98 to facilitate bolting the motors in position. The holes 88—98 are slightly larger than the pinion gears 80 to enable the pinion gears to be fixed to the motor shafts before the motors are mounted in position. This facilitates replacing motors without having to disassemble the power unit. Each of the motors has two elongated tie bolts 102 (See FIG. 3) which are exposed on the ends of the motor and extend therethrough to threadably engage the bolt holes 100. The motors can be replaced by simply removing these bolts. As best seen in FIG. 2 the small chain sprocket 44 is connected to a hub 104 fitted over the hub 76 of the ring gear and fixed thereto by a set screw 106.

By symmetrically disposing the pinion gears 80 within the internal ring gear 70, the driving forces on the ring gear are balanced. This enables the ring gear 70 to be moulded from a tough plastic material suitable for such an application. Using a moulded plastic ring gear 70 significantly reduces the cost of the power unit.

As mentioned previously the power unit 22 is designed to operate the go-kart 20 at a speed of about 4 to 6 miles per hour. When more power is desired additional motors can easily be added. And, if desired, one or the other or both of the chain sprockets can be replaced to increase the speed of the vehicle. As the speed of the vehicle is increased a simple rheostat can be incorporated in the switch 50 to enable the current to the motors to be varied to control the speed of the go-kart, as well as, to turn the motors on and off.

By providing six symmetrically positioned holes 88—98 in the cup-shaped housing 64 two, three, four, or six motors can be employed and arranged symmetrically to balance the loading on the moulded plastic ring gear 70. For example, three motors can be symmetrically positioned in holes 90, 94 and 98, four motors can be symmetrically positioned in holes 88, 90, 94 and 96 and six motors can be symmetrically positioned by using all of the holes 88—98.

Since the cylindrical wall 66 of the cup-shaped housing 64 closely overlies the cylindrical outer surface of the ring gear 70 the unit is effectively sealed, and the pinion gears 80 and internal gear teeth are completely enclosed. The overall outside diameter of the power unit 22 is minimized by using the internal ring gear and the overall unit provides a light weight, compact, simple and economical electric power unit with a sizeable speed reduction determined by the ratio of the pinion gears to the internal ring gear.

The permanent magnet motors 46 are subfractional horsepower motors. Fractional horsepower motors are well known and commonly are ½-or ¾-horsepower motors used for running many types of appliances. Subfractional horsepower motors are significantly smaller and are hereby defined as electric motors rated at one-third horsepower or less. The permanent magnet motors 46 used with the power unit 22 are less than one-tenth horsepower and specifically have a horsepower rating of .047 to .07 horsepower. Permanent magnet motors less than one-tenth horsepower have proved to be very satisfactory for all of the applications disclosed herein.

The motors 46 have two nonoriented barium ferrite magnets overlying the periphery of a rotatable wound armature at diametrically opposed positions. The armature has three slots equally spaced about the periphery thereof and extending axially thereacross. The wire of the armature winding is positioned in the slots in the armature in a conventional manner. The housing of the motors 46 are about 2½ inches in diameter and 3½ inches long. The pinion gears 80 for driving the internal ring gear are mounted directly on the motor output shafts and the internal motor bearings are relied on for rotatably supporting the pinion gears. This has been completely satisfactory for the various applications for the power units described herein because the driving power is divided among a plurality of motors to minimize the load on the individual bearings. Obviously using the internal motor bearings in this manner without providing additional bearings for supporting the pinion gears produces significant cost savings. The only bearing in the power unit which carries a substantial loading is the bearing for rotatably journaling the shaft 62. Since the shaft is rotatably supported within the elongated sleeve 60 connected to the vertical portion 58 of the supporting bracket 54, ample room is provided for a sturdy bearing for journaling the shaft within the sleeve. It is apparent that the lightweight, compact power unit 22 employing the plurality of permanent magnet motors will make more efficient use of the electrical power available from a limited low voltage DC source (such as the battery 36 alone or combined with other batteries) as compared to prior art electrical power units employing field wound motors.

Figure 5:
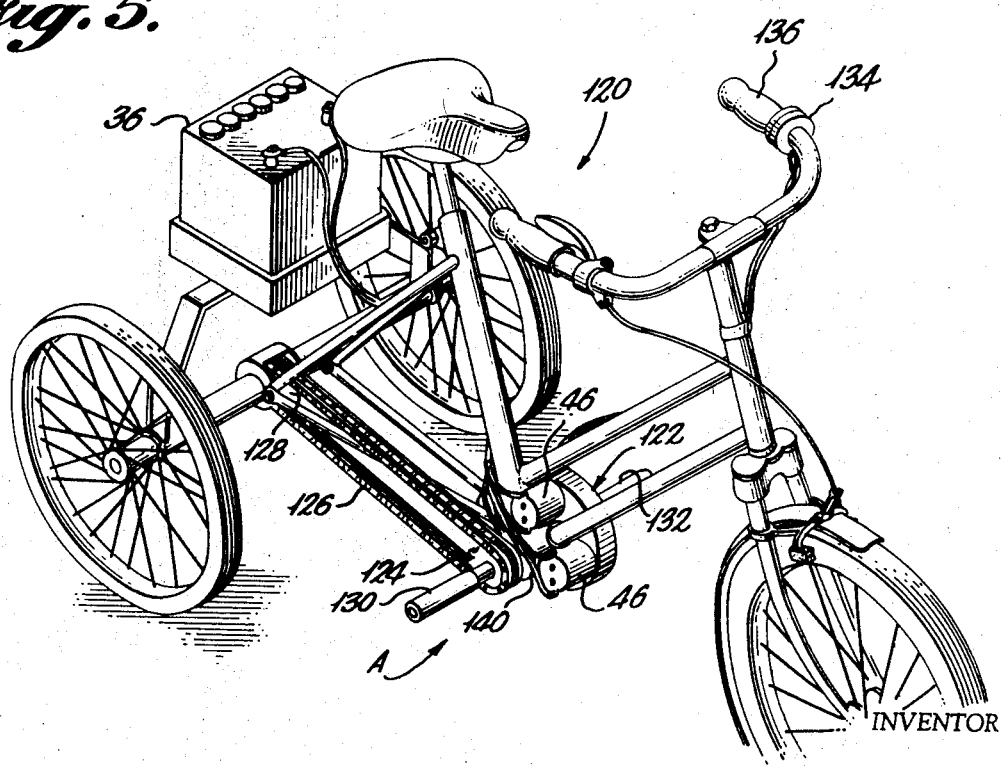
FIG. 5 is a perspective view of a tricycle driven by a power unit of the present invention.

Referring to FIG. 5 a chain driven tricycle 120 is illustrated which is driven by a power unit 122 which is substantially the same as the power unit 22 previously described. The power unit 122 drives a chain sprocket 124, a chain 126 and a chain sprocket 128 drivingly connected to the rear axle of the tricycle for driving the rear wheels. Foot pedals 130 and 132 are mounted on opposite sides of the power unit, as will be described, in position to support the rider's feet.

As in the previous embodiment, the motors 46 are connected in parallel with one another and connected in series with the battery 36 and a rheostat 134 mounted on the handle bar in position to be actuated by rotation of the left-hand grip 136. The hand grip 136 is normally spring biased to an off position (by spring means not shown) to open a switch in the rheostat 134 to interrupt the circuit to the motors. Rotation of the hand grip 136 in one direction against the spring bias closes the switch to energize the motor. Continued rotation in the same direction decreases the resistance of the rheostat 134 in series with the battery to increase the current flow to the motors and thus increase the speed of the tricycle. When the grip 136 is released, it is spring biased back to the off position to interrupt the power to the motors.

Referring to FIGS. 6 and 7, as well as FIG. 5, the power unit 122 is mounted on the hub 140 of the tricycle which in turn is supported between the front and rear wheels by the tubular frame of the tricycle. It will be observed that the power unit 122 has three motors 46 symmetrically spaced to form an equilateral triangle. A shaft 142 is rotatably journaled within the hub 140 by a pair of ball bearings 145. The moulded plastic internal ring gear 70 is fixed on one end of the shaft 142 by a set screw 146 engaging a flat 144 on the shaft. The cup-shaped housing is secured to the hub 140 by bolts 150. The chain sprocket 124 is similarly keyed to the shaft 142 by a set screw 148 engaging a flat 150 on the shaft 142. As best seen in FIG. 7, the foot-rests 130 and 132 are formed by sleeves of a suitable plastic material rotatably journaled on the ends of the shaft 142 and axially positioned by snap rings 154.

In FIG. 7 it will be observed that the motor 46 has a small projecting boss 156 which houses the front motor bearing. The motor output shaft 84 projects from this boss 156 in position to support the pinion gear 80 which meshes with the internal gear teeth of the ring gear 70. A washer shaped spacer 161 is positioned about the boss 156 to center the boss in the access hole in the cup-shaped housing. The outside diameter of the washer 161 is slightly larger than the outside diameter of the pinion gear to enable the motor 46 to be detached from the cup-shaped housing 64 along with the pinion gear as an assembly as previously described. Washer shaped end covers 160 are mounted in each end of the hub 140 to seal the interior thereof.

Figure 8:
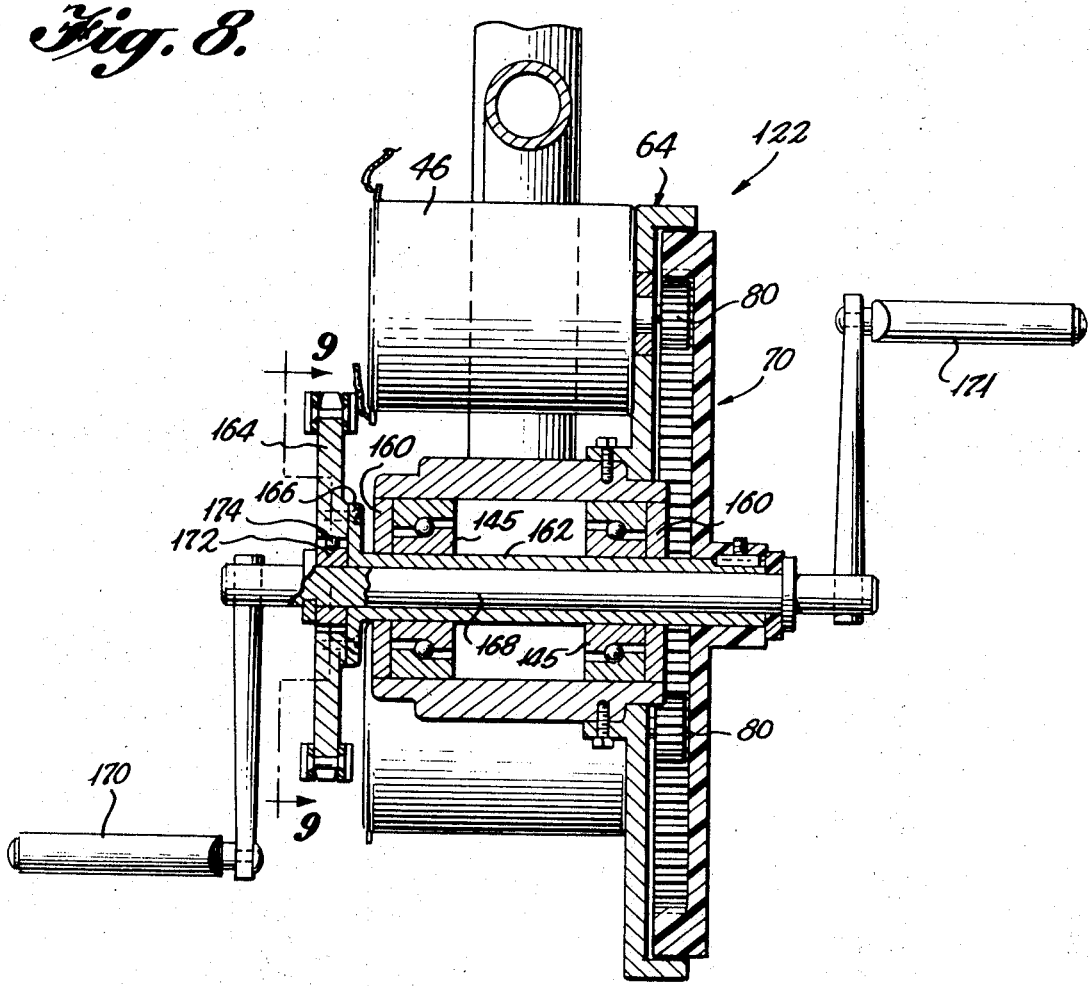
FIG. 8 is a sectional view similar to that of FIG. 7 illustrating another embodiment of the power unit for driving the tricycle of FIG. 5.
Figure 9:
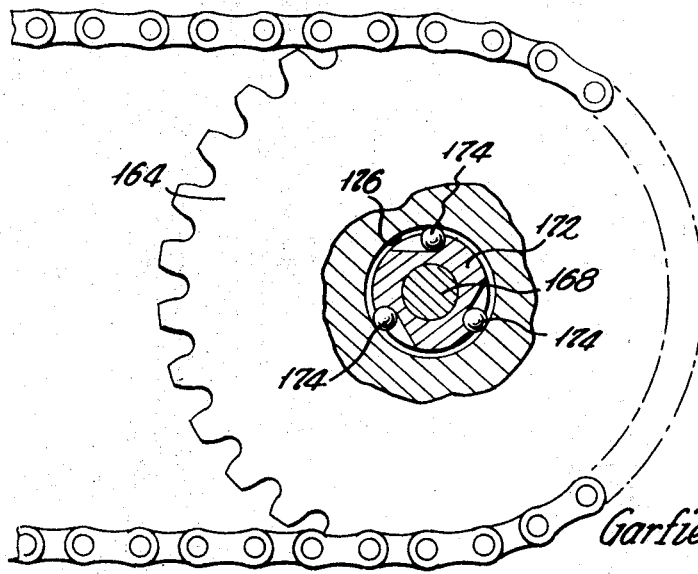
FIG. 9 is a sectional view taken along the line 9–9 of FIG. 8.

Referring to FIGS. 8 and 9 a modification of the structure illustrated in FIGS. 6 and 7 is illustrated which enables the rider to pedal the tricycle, if necessary. The internal ring gear 70 is keyed to a sleeve 162 which is rotatably journaled by the ball bearings 145. A drive sprocket 164 is connected to a flange 166 on the other end of the sleeve 162 for rotation by the ring gear 70. A shaft 168 is rotatably journaled within the sleeve 166 and the crank arms of conventional pedals 170 and 171 are mounted on the ends of the shaft. A one way clutch element 172 is fixed to the shaft 168 for rotation therewith with a plurality of balls 174 retained between the one way clutch element and a central opening in the chain sprocket 164.

With this construction, motor 46 drives the ring gear 70 which drives the chain sprocket 164 in a clockwise direction as viewed in FIG. 9. It is apparent that the pedals 170 and 171 will not rotate with the chain sprocket 164 unless the clutch element 172 is rotated in a clockwise direction relative to the chain sprocket 164 to wedge the balls 174 between the clutch element and the chain sprocket in a manner to produce a driving connection. This is a well known type of one way clutch construction, and the manner in which the balls engage and disengage the clutch element 172 with the chain sprocket 164 will be well understood by those skilled in the art.

In the event the battery runs down, or in the event the rider wants to assist the motors in propelling the tricycle up a steep hill, the pedals can be actuated by the rider to rotate the clutch element 172 in a clockwise direction as viewed in FIG. 9 to drive the chain sprocket 164.

Referring to FIGS. 10—12 a power unit 180 is illustrated for driving the rear wheel of a bicycle 182. A DC battery 184 is mounted on the carrier 186 of the bicycle and is connected to the motors 46 of the power unit and the rheostat 134 as previously described in connection with the tricycle of FIG. 5. The rheostat is controlled by rotation of the right hand grip 188 to control the current supply to the motors.

The hub 190 of the rear wheel 192 is fixed to a sleeve 194 which extends over and is fixed to an axle shaft 196 having a cylindrical head 198 on one end thereof and a washer 200 and nut 202 on the other end thereof. The cup-shaped housing 204 of the power unit 180 is journaled on the cylindrical head 198 of the bolt by a flanged sintered bushing 206 and is secured against rotation by brackets 208 and 210 secured to the cylindrical surface thereof and clamped to the rear wheel forks of the bicycle frame.

The internal ring gear 212 is mounted on one end of the sleeve 194 and forms with the sleeve a one way clutch element including a plurality of clutch balls 214, one of which is shown in FIG. 11. A thrust washer 216 is interposed between the bolt head 198 and the ring gear 212 to facilitate relative rotation therebetween.

A chain sprocket 220 is mounted on the other end of the sleeve 194 and forms with the other end of the sleeve a one way clutch having a plurality of clutch balls 222 therebetween. As illustrated in FIG. 12 the clutch balls 222 are in their disengaged position. When the chain sprocket 220 is rotated in a clockwise direction as viewed in FIG. 12 by the rider pumping the bicycle pedals, the clutch balls 222 will wedge between the sleeve 194 and the chain sprocket 220 to establish a driving connection for propelling the bicycle. If the motors 46 of the power unit 180 are deactivated when the bicycle is pedalled, the one way clutch balls 214 between the internal ring gear 212 and sleeve 194 will enable the wheel 192 to turn without rotating the internal ring gear.

Conversely, when the motors 46 are energized by rotating the righthand grip 188, they will drive the internal ring gear in a clockwise direction as viewed in FIG. 12 to rotate the sleeve 194 through the clutch balls 214 to drive the rear wheel 192. The clutch balls 222 of the one way clutch associated with the chain sprocket 220 will move to the disengaged position as illustrated in FIG. 12 if the rider simply rests his feet on the pedals without attempting to pedal the bicycle. In the event the battery runs down or the bicycle slows down on a steep hill, the rider can pedal the bicycle to drive the chain sprocket 220 through its one way clutch to help the motors 46 drive the bicycle.

Referring to FIGS. 13—15 a small compact automobile 248 is illustrated having a separate electric power unit 250 for driving each of the wheels of the automobile. As in the previous power units the motors 46 are mounted directly on a cup-shaped housing 252 with the pinion gears 80 engaging an internal ring gear 254. A combined radial and thrust bearing 256 is fixed within a hub 258 of the cup-shaped housing for rotatably journaling a shaft 260 on which the internal ring gear 254 is fixed. An enlarged flange 262 on the right end of the shaft 260 as illustrated in FIG. 14 has a plurality of threaded studs 264 projecting therefrom to enable the wheel 266 to be bolted to the flange 262.

The hub 258 of the cup-shaped housing is connected to a conventional leaf spring 268 by a "U" shaped bolt 270. The ends of the leaf spring are pivotally connected to supporting brackets 272 fastened to a channel shaped frame member 274 which forms part of the frame of the automobile. Electric power is provided to the motors 46 by a cable 276 connected to a plug 278 mounted on the cylindrical wall of the cup-shaped housing 252. Wires (not shown) extend from the plug 278 to each of the motors 46 to connect the motors in parallel with one another.

A plurality of 12-volt DC batteries (not shown) are mounted in the trunk of the automobile and variable resistance means (not shown) is connected in circuit with the batteries and the electric power units 250 to control the current supply to the power units and thus control the speed of the vehicle. The circuit is arranged to supply 12 volts to each power unit. The variable resistance means is controlled by the accelerator pedal. When the accelerator pedal is released by the driver, it returns to its normal position and the circuit to the power units is interrupted. As the accelerator is depressed, the resistance in circuit decreases to increase the current supplied to the power units.

Figure 16:
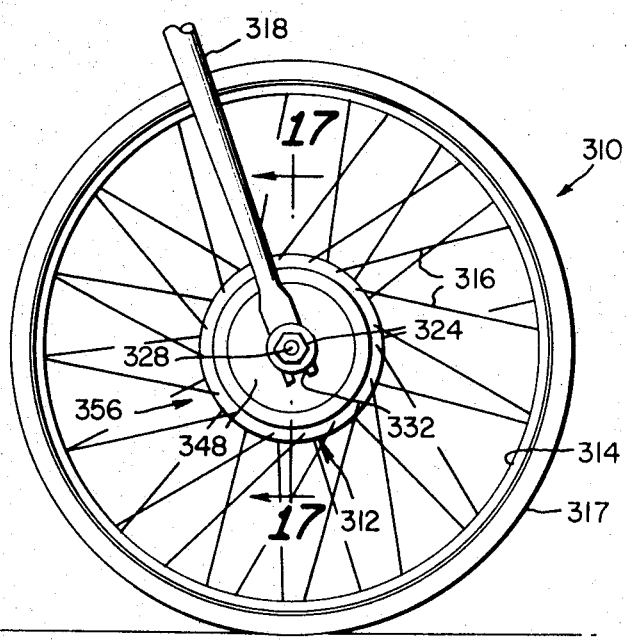
FIG. 16 is an elevational view of the front wheel of the bicycle of FIG. 10 illustrating another embodiment thereof.

Referring to FIG. 16, an electric power wheel 310 is shown which illustrates another embodiment of the invention. The wheel 310 comprises an electric power unit hub 312, a rim 314 connected to the hub by a plurality of spokes 316 in a conventional manner, and an inflated tire 317 mounted on the rim 314.

Referring to FIG. 17 as well as to FIG. 16, the power unit hub has an axle 322 connected to forks 318 and 320 by nuts 324 and 326 threadably engaging threaded end portions 328 and 330, respectively, of the axle. The forks are the front forks of the bicycle illustrated in FIG. 10 and the power unit hub 312 replaces the power unit 180. This enables a standard bicycle to be used with no changes in the pedal drive and rear wheel. The power wheel 310 is simply substituted for the conventional front wheel, the DC battery 184 mounted on the rear carrier 186 (or under the seat in the case of a 16-inch-high rise bicycle) and control switch 134 added to control the current supplied to the power unit hub 312.

The forks 318 and 320 have slots 332 and 334 therein which open on the lower ends of the forks. The slot 332 extends over a flat sided projection 336 on the left face of a cylindrical element 340 fixed to the axle 322. With this construction the fork 318 retains the axle 322 against rotation. A plain washer 342 is interposed between the nut 324 and the flatted projection 336, and a lock washer 344 is interposed between the nut 324 and the plain washer 342. A thrust washer 346 is interposed between the front fork 318 and a circular end cover 348 of the electric power unit hub 312. A flange 352 is formed on the inner end of the cylindrical portion 340 in position to engage the end of an internal boss 354 projecting inwardly from the end plate 348. This construction restricts the axle 322 against axial and rotary movement relative to the fork 318 and end cover 348.

The slot 334 in the fork 320 extends over a flat sided nut 356 threadably engaged on the threaded portion 330 of the axle 322. A plain washer 358 and lock nut 360 are interposed between the fork 320 and the nut 326. A thrust washer 362 is interposed between the fork 320 and the power unit hub 312. This construction restricts axial movement between the fork 320 and the axle 322 and the power unit hub 312.

Figure 20:
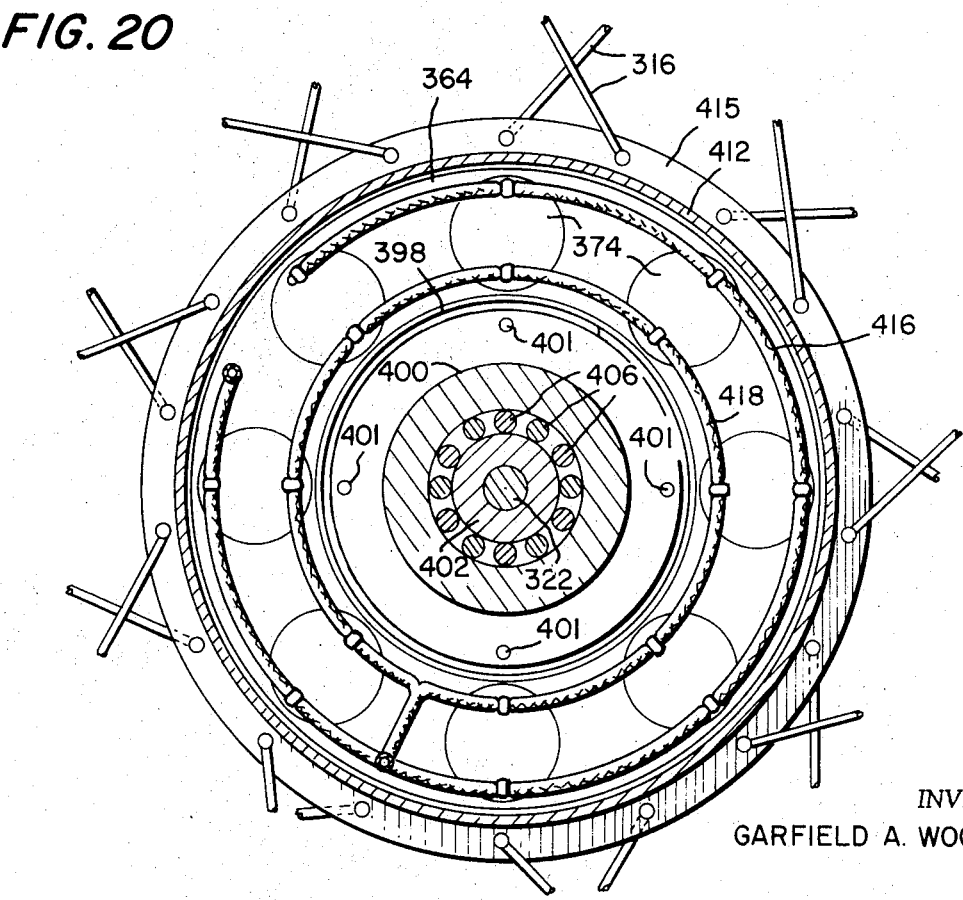
FIG. 20 is a reduced sectional view taken along the line 20–20 of FIG. 17.
Figure 18:
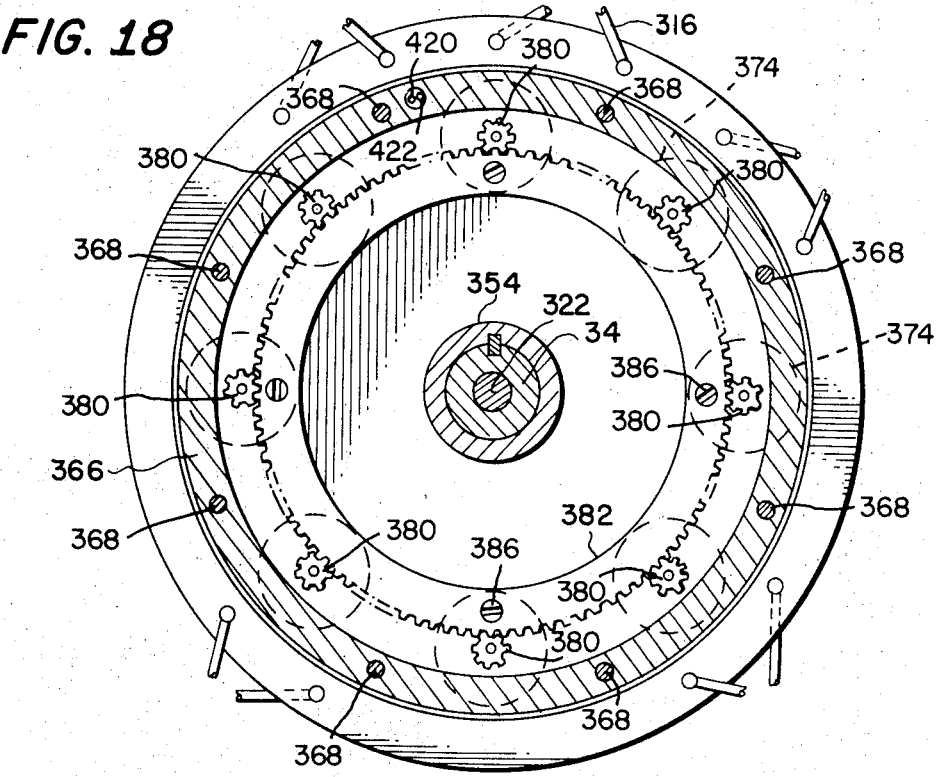
FIG. 18 is a reduced sectional view taken along the line 18–18 of FIG. 17.
Figure 19:
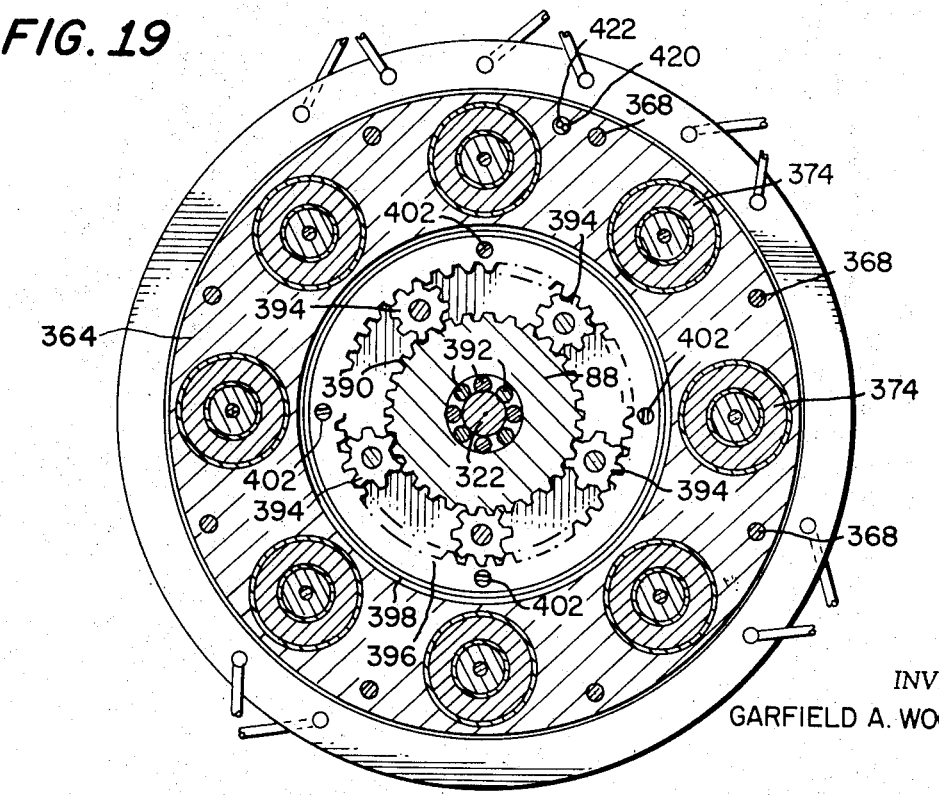
FIG. 19 is a reduced sectional view taken along the line 19–19 of FIG. 17.

Referring to FIGS. 18—20 as well as to FIGS. 16 and 17, the power unit hub 312 comprises an annular motor supporting body 364 fastened to an inwardly projecting rim 366 of the end cover 348 by a plurality of screws 368. The body 364 has a plurality of parallel aligned cylindrical motor cavities 370 therein which open on the right face of the body as viewed in FIG. 17 and are closed at the left face bottom walls 372. A subfractional permanent magnet motor 374 is fixed within each of the motor cavities 370. In the preferred embodiment illustrated each of the motors 374 has a diameter of about 1 inch and an axial length of about 1¾ inches. The output shaft 376 of each of the motors projects through the bottom wall 372 of the cavity associated therewith and is journaled in the bottom wall by a sleeve bearing 378.

A pinion gear 380 is fixed on the output shaft 376 of each of the motors. The pinion gears 380 mesh with the teeth of a molded plastic external ring gear 382 fixed to the periphery of a flange 384 by a plurality of screws 386. The flange 384 projects radially from a hub 388 having external gear teeth 390 thereon as best seen in FIG. 19. The hub 388 is rotatably journaled on the axle 322 by roller bearings 392.

A plurality of pinion gears 394 are rotatably mounted on a radially inward projecting flange of the motor supporting body 364 in position to mesh with the gear teeth 390. The pinion gears 394 also mesh with the internal gear teeth of a molded plastic internal ring gear 396. The internal ring gear 396 is fixed to the cup-shaped flange 398 projecting from a hub 400 by a plurality of screws 401. The hub 400 is rotatably journaled on a sleeve bearing 402 by axially spaced sets of roller bearings 404 and 406. The sleeve bearing 402 is rotatably mounted on the axle 322.

The power unit hub 312 includes a cylindrical wall portion 412, projecting radial flanges 414 and 415 and a washer shaped end wall 408. The spokes radial 316 are connected to the flanges 414 and 415 in a conventional manner. The end wall 408 is fastened to a flange of a collar 409 by a plurality of screws 410. The collar is fixed to the bearing sleeve 402 by set screws 411.

The motors 374 are electrically connected in parallel with one another by suitable wires 416 and 418, as best seen in FIGS. 17 and 20. Electrical power is supplied to the wires 416 and 418 by wires 420 and 422, respectively, which extend through the motor supporting body 364 and the rim 366 of the end cover, through a suitable opening in the fork 318, as best seen in FIG. 17 and then upwardly through the fork to the control switch 304 on the handle bar of the bicycle. The control switch is connected to the battery by a cable 306. The wires 320 and 322 are connected to the battery with the control switch in series therewith in a manner to turn the motors on and off and to vary the current supplied to the motors to control the speed of the bicycle.

When the motors 374 are energized by the switch the pinion gears 380 rotate the ring gear 382 at a reduced speed. The external gear teeth 390 on the hub 388 rotate at the same r.p.m. as the ring gear 382. The gear teeth 390 rotate the internal ring gear 396 through the pinion gears 394 at a further reduced speed. The hub 400 is rotatably journaled on the hardened sleeve bearing 402 by the axially spaced roller bearings 404 and 406 as previously described. A conventional one way clutch element having a plurality of roller bearings 407 is positioned between the roller bearings 404 and 406. With this construction the hub 400 rotates the sleeve bearing 402 through the one way clutch element in one direction of rotation (the axle 322 remaining stationary at all times) while permitting the hardened sleeve 402 to overrun the hub 400, when the wheel is rotating faster, such as, when the bicycle is going downhill, or when the bicycle is coasting with the motors 374 deenergized.

Figure 21:
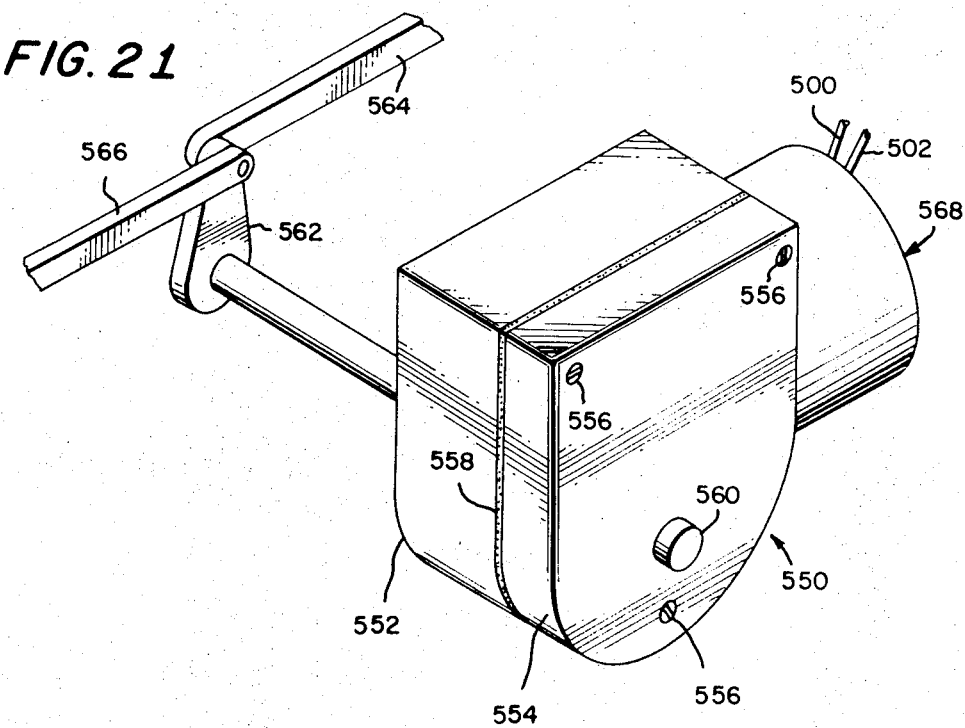
FIG. 21 is a perspective view of a wiper motor unit illustrating another embodiment of the invention.

Referring to FIG. 21 a windshield wiper motor unit 550 is shown which illustrates another embodiment of the invention. The wiper motor unit 550 comprises a housing 552 closed at one end by a cover plate 554 fastened to the housing by screws 556 with a gasket 558 interposed between the housing and cover plate. An output shaft 560 is journaled in the housing with one end thereof having a crank arm 562 mounted for rotation therewith through 360°. Links 564 and 566 are pivotally connected to the end of the crank arm so as to be reciprocated back and forth each time the crank arm rotates through 360°. The other ends of the links 564 and 566 are connected to the linkage mechanism and crank arms associated with the wiper blades of a conventional wiper cleaning system for automotive vehicles. With this well known construction, the wiper blades (not shown) are oscillated through one complete wiping cycle each revolution of the output shaft 560.

Figure 22:
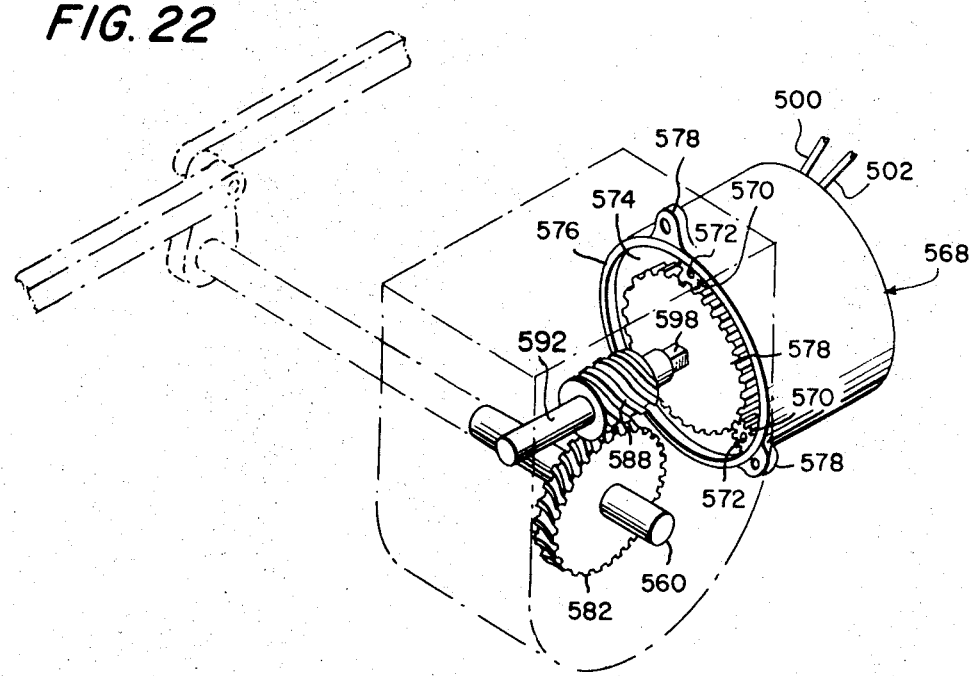
FIG. 22 is a perspective view of the wiper motor unit of FIG. 21 with part of the housing shown in phantom.

A motor housing 568 is mounted on the housing 552 in position to enclose and support three subfractional horsepower permanent magnet electric motors. The motors are the same as the motors 374 of the power unit 350 previously described, and are supported in the housing 568 in the same manner as the motors 374 are supported in the body 364 (See FIG. 17). As best seen in FIG. 21, a pinion gear 570 is fixed to the output shaft 572 of each of the three motors. Two of the pinion gears 570 can be seen in FIG. 22 and the third is located in position to form the third point of an equilateral triangle. The motor output shafts 592 are journaled by suitable sleeve bearings (not shown) mounted in a partition wall 574 of the motor housing recessed inwardly from the left end 576 of the motor housing. Suitable lugs 577 are provided for mounting the motor housing 568 on the housing 552.

The three pinion gears 570 mesh with a large collector gear 578 rotatably journaled on the wall 574. The wall of the housing 552 on which the motor housing 568 is mounted closes off the left end 576 of the motor housing so as to enclose the collector gear 578 and pinion gears 570. A worm wheel 582 is mounted on and drivingly connected to the output shaft 560. A worm 588 meshes with the worm wheel 582 and is rotatably journaled on the side walls of the housing 552 by a shaft 592. The right end of the shaft 592 projects through the side wall of the housing and has a squared end portion 598 which projects into a square opening in the face of the collector gear 578. With this construction the shaft 592 is keyed to the collector gear 578 so that the worm 588 is driven directly by the collector gear. When the motor housing 568 is removed from the housing 552, the collector gear slides off of the squared end portion 598 and remains with the motor housing.

When the motors are energized the worm wheel 582 is rotated to rotate the crank arm 562 in a direction depending on the direction of rotation of the motors. In the preferred embodiment illustrated the gear, worm and worm wheel are designed to rotate the output shaft 560 at about 70 r.p.m., and thus oscillate the wiper blades at about 70 wiping cycles per minute at full motor speed. This wiping speed can be reduced in a number of ways, including the conventional way of reducing the current flow to the motors by a resistance connected in series between the battery and the parallel connected motors.

The collector gear 578, worm 588 and worm wheel 582 are preferably molded of a suitable tough plastic material such as the well known Delran. The wiper motor unit 550 can be designed with the number and size of permanent magnet motors needed to produce the desired speed-torque curves for the wiper motor unit at the various speeds at which it is to be operated.

In many windshield wiper applications, a single permanent magnet motor cannot satisfy the increased torque demands imposed on the wiper motor unit by the windshield wiper cleaning systems of many new cars. This is particularly true in the case of a current model car in which the wiper blades in the park position are moved into a slot beneath the windshield so they are parked out of sight. To do this the blades must be driven off the glass on to a metal ramp in the slot.

In addition, the increased length of many of the new wiper blades and the increased spring pressure with which they are urged against the windshield make it impracticable to use a single permanent magnet motor for the wiper motor unit. Because of the aforementioned problems, windshield wiper motor units for many types of automotive vehicles employ larger, more expensive, field wound motors. Permanent magnet motor manufacturers have attempted to advance the state of the art to produce a more powerful windshield wiper motor and have produced successful prototypes. However, they have not been able to produce such motors in production at an acceptable cost.

It is apparent that the wiper motor unit 550 of the present invention avoids these permanent magnet motor problems by using a plurality of motors and thus enabling smaller less expensive motors to be used. An appropriate number of permanent magnet motors and gear ratios can be selected to provide a wiper motor unit to meet the torque and performance requirements of all automotive windshield wiper applications now in existence and which, in the future, may be established. And this is done at a cost savings relative to comparable wiper motor units employing a single field wound motor, and many units employing a single permanent magnet motor.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, in addition to propelling vehicles of the type described, the electric power unit of the present invention can also be employed for propelling other types of wheeled vehicles, and can be employed for many applications which do not involve a wheeled vehicle. As an example of the latter, a handle could be attached to the cup-shaped housing of the power unit and buffing wheel suitably attached to the rotating internal ring gear (preferably in coaxial alignment therewith) to form a simple buffer for buffing and polishing floors.

Also the power of the power unit could be increased by mounting a second internal ring gear back to back with the first internal ring gear and positioning a cup-shaped housing over this ring gear for supporting another set of small electric motors for driving the second internal ring gear. The two ring gears could be connected together or could be made as one gear. The two-cup-shaped housings could also be interconnected and designed to rotatably journal the internal gear. Such a power unit could have twice the power of the units shown in the drawings and still provide a compact package.

With regard to FIG. 17, the cylindrical portion 412 of the power unit hub 312 and its projecting flanges could be formed in a manner to support an inflated or solid rubber tire directly thereon, rather than having the spoked connection to a larger rim. Also the periphery of the hub could be provided with a configuration to form a V-groove of a pulley wheel. The latter would produce a small compact electrically powered pulley. It will also be apparent that many other applications can be devised for the power wheel concept of FIGS. 16—22 wherein the motors and gear reduction unit are mounted within a wheel.

I claim:

1. In combination, a wheeled vehicle, a limited low voltage source of DC power mounted on said vehicle and an electric power unit connected to said source, said power unit comprising a plurality of subfractional horsepower permanent magnet electric motors mounted on said vehicle each having an output shaft, output means rotatably mounted on said vehicle, means for drivingly connecting said motor output shafts to said output means, and drive means for drivingly connecting said output means to a wheel of said wheeled vehicle.

2. The invention as defined in claim 1 wherein each of said permanent magnet motors comprises a three slot wound armature with two permanent magnets overlying the periphery of said armature.

3. The invention as defined in claim 2 wherein said output means comprises an output gear and said means drivingly connecting said output shafts to said output gear comprises a gear mounted on each of said output shafts and drivingly connected to said output gear.

4. The invention as defined in claim 1 wherein said output means comprises an output gear and said means drivingly connecting said output shafts to said output gear comprises a gear mounted on each of said output shafts and drivingly connected to said output gear.

5. The invention as defined in claim 4 wherein said output gear is an internal ring gear and said motor gears are positioned inside said ring gear and mesh directly with the teeth of said ring gear.

6. The invention as defined in claim 5 wherein said motor gears are symmetrically positioned within said ring gear to balance the loading on the ring gear.

7. The invention as defined in claim 5 wherein said ring gear is a molded plastic ring gear.

8. The invention as defined in claim 5 wherein said electric power unit comprises support means having a wall, said ring gear being adjacent to one side of said wall and being rotatable relative thereto about an axis substantially perpendicular to said wall, said motors being mounted on said support means on the other side of said wall with the output shafts thereof projecting through said wall into said ring gear, said motor gears being mounted on said output shafts on said one side of said wall and meshing with the internal teeth of said ring gear, said drive means drivingly connecting said ring gear to a wheel of said wheeled vehicle.

9. The invention as defined in claim 8 wherein said support means includes a cylindrical wall projecting from said wall and surrounding said ring gear, said ring gear being cup-shaped and being rotatably mounted within said wall to form a compact power unit with all of the gear teeth of said gears enclosed.

10. The invention as defined in claim 8 wherein said wall is adapted to support a plurality of different groups of motors with the motors of each group being symmetrically positioned.

11. The invention as defined in claim 10 wherein said wall is adapted to receive at least six symmetrically positioned motors so that groups of two, three, four and six motors can be mounted on said wall and positioned symmetrically relative to one another.

12. The invention as defined in claim 8 wherein said vehicle is a bicycle and said electric power unit is mounted on said bicycle in coaxial alignment with the rear wheel thereof with said ring gear drivingly connected to said rear wheel.

13. The invention as defined in claim 8 wherein said vehicle is a cycle having drive sprocket drivingly connected to a wheel of the cycle by a chain and sprocket drive pedal means and one way clutch means drivingly connecting said pedal means to said drive sprocket, and wherein said power unit is mounted on said cycle in coaxial alignment with said drive sprocket with said ring gear drivingly connected to said drive sprocket, whereby said pedal means can be employed to assist said power unit in driving said cycle.

14. The invention as defined in claim 8 wherein said vehicle is an automotive vehicle having four wheels, and wherein said power unit is mounted in coaxial alignment with at least one of said four wheels with said ring gear connected to said one wheel to rotate the wheel at the same r.p.m. as the ring gear.